(12) United States Patent
Kaneko et al.

(10) Patent No.: US 8,174,221 B2
(45) Date of Patent: May 8, 2012

(54) MOTOR CONTROL APPARATUS AND CONTROL APPARATUS FOR HYBRID ELECTRIC VEHICLES

(75) Inventors: Satoru Kaneko, Naka (JP); Tatsuyuki Yamamoto, Isehara (JP); Tokihito Suwa, Hitachinaka (JP); Yuuichirou Takamune, Naka (JP); Kenta Katsuhama, Hitachiaka (JP); Kimihisa Furukawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 520 days.

(21) Appl. No.: 12/270,461

(22) Filed: Nov. 13, 2008

(65) Prior Publication Data

US 2009/0128069 A1 May 21, 2009

(30) Foreign Application Priority Data

Nov. 16, 2007 (JP) .................................. 2007-298491

(51) Int. Cl.
*H02P 1/04* (2006.01)
(52) U.S. Cl. ............. 318/400.09; 318/400.01; 318/700; 318/599
(58) Field of Classification Search ............. 318/400.09, 318/400.01, 700, 599
See application file for complete search history.

(56) References Cited

U.S. PATENT DOCUMENTS

| 6,777,897 B2 * | 8/2004 | Murai ........................ 318/400.2 |
| 6,958,586 B2 * | 10/2005 | Tanimoto ................. 318/400.02 |
| 7,245,104 B2 * | 7/2007 | Tomigashi et al. ........... 318/705 |

FOREIGN PATENT DOCUMENTS

| JP | 62-131791 | 6/1987 |
| JP | 11-285288 A | 10/1999 |

OTHER PUBLICATIONS

Office Action in Japanese Patent Application No. 2007-298491 dated Jan. 17, 2012.

* cited by examiner

*Primary Examiner* — Walter Benson
*Assistant Examiner* — David Luo
(74) *Attorney, Agent, or Firm* — Crowell & Moring LLP

(57) ABSTRACT

To provide a motor control apparatus that uses an inverter to drive an AC motor and hybrid automotive control apparatus adapted to drive an AC motor by use of an inverter while reducing torque pulsations during switching from PWM driving to rectangular-wave driving. The motor control apparatus 100 has a PWM driving mode in which to input a PWM signal to the inverter 8 and perform PWM driving of the AC motor 4, and a rectangular-wave driving mode in which to input a rectangular-wave signal to the inverter 8 and perform rectangular-wave driving of the AC motor 4. For switching from the PWM driving mode to the rectangular-wave driving mode, a driving-pulse switching block 140 performs the switching process within a maximum pulse-width range of high-level or low-level pulses developed in the PWM driving mode.

3 Claims, 9 Drawing Sheets

MOTOR CONTROL APPARATUS AND CONTROL APPARATUS FOR HYBRID ELECTRIC VEHICLES

BACKGROUND OF THE INVENTION

1. Field of the Invention

The present invention relates to a motor control apparatus and a control apparatus for hybrid electric vehicles

2. Description of the Related Art

Automobiles that use a motor as a motive power source to run have been increasing in recent years. These vehicles are environment-responsive automobiles represented by electric automobiles and hybrid vehicles. Some of the major features of these environment-responsive automobiles include using the electric energy of a battery to generate a torque from the motor and thus to actuate tires. For accelerated miniaturization of a power train, an alternating-current (AC) motor such as a permanent-magnet synchronous motor is primarily used as the above driving motor. Additionally, a power inverter is used to supply DC power from the battery to the AC motor, and the DC power from the battery is converted into AC power. The control of this inverter allows variable-speed control of the driving AC motor.

The motor control apparatuses used in these hybrid vehicles have traditionally employed the sine-wave PWM (Pulse Width Modulation) driving scheme in which an AC sine-wave voltage to be applied to the motor is converted into PWM signal form. The sine-wave PWM driving scheme, however, has limits on the voltage utilization ratio of the inverter and is therefore insufficient for providing more powerful driving in the high-speed region of the motor. For this reason, rectangular-wave driving (one-pulse driving) has recently come into use. Rectangular-wave driving only requires on/off control of a voltage pulse, depending upon the plus/minus sign of the voltage command, instead of executing PWM driving in the high-speed region of the motor.

In the rectangular-wave driving scheme, since PWM conversion is not executed and the pulse signal is of such a waveform that the signal is turned on or off, depending upon the plus/minus sign of the AC voltage signal to be applied, the maximum voltage permissible for the inverter to output can be applied to the motor and this motor can be driven in a wider operating range.

As can be understood from the above, to selectively use PWM driving and rectangular-wave driving in different operating regions of the motor, switching from PWM driving to rectangular-wave driving is needed, and the switching operation causes torque pulsations. Accordingly, there is a known technique in which an overmodulation mode for changing continuously the waveform of a voltage signal from the initial sine waveform thereof existing before mode switching, into a rectangular waveform to be obtained after mode switching, is inserted midway between PWM driving and rectangular-wave driving modes to gradually change the signal in amplitude as an AC voltage signal and reduce any torque pulsations occurring during mode switching. JP-A-11-285288, for example, discloses such a technique.

SUMMARY OF THE INVENTION

In the above conventional technique, a pattern change of the voltage pulse to be applied is repeated six times in one period of the motor in the rectangular-wave driving mode. At this time, if, as described in JP-A-11-285288, switching from PWM driving to rectangular-wave driving is executed while only the amplitude of the voltage vector to be applied is being continuously changed, the resulting phase difference between the voltage vector applied during PWM driving, and that of rectangular-wave driving, will cause a difference in potential, thus resulting in torque pulsations occurring during mode switching.

An object of the present invention is to provide a motor control apparatus that uses an inverter to drive an AC motor and hybrid automotive control apparatus adapted to drive an AC motor by use of an inverter while reducing torque pulsations during switching from PWM driving to rectangular-wave driving.

In order to attain the above object, the present invention provides a motor control apparatus outputs a PWM signal to an inverter when a PWM driving mode that is PWM driving of the AC motor by the inverter, and a rectangular-wave signal to the inverter when a rectangular-wave driving mode that is rectangular-wave driving of the AC motor by the inverter; the motor control apparatus comprises a driving-pulse switching section, when switching driving control from the PWM driving mode to the rectangular-wave driving mode, for performing the switching process within a maximum pulse-width range of high-level or low-level pulses in the PWM driving mode.

According to the present invention, torque pulsations during switching from PWM driving to rectangular-wave driving can be reduced in the motor control apparatus that uses an inverter to drive an AC motor.

DESCRIPTION OF THE PREFERRED EMBODIMENTS

Hereunder, the configuration and operation of a motor control apparatus according to an embodiment of the present invention will be described using FIGS. 1 to 14.

Figure 1:
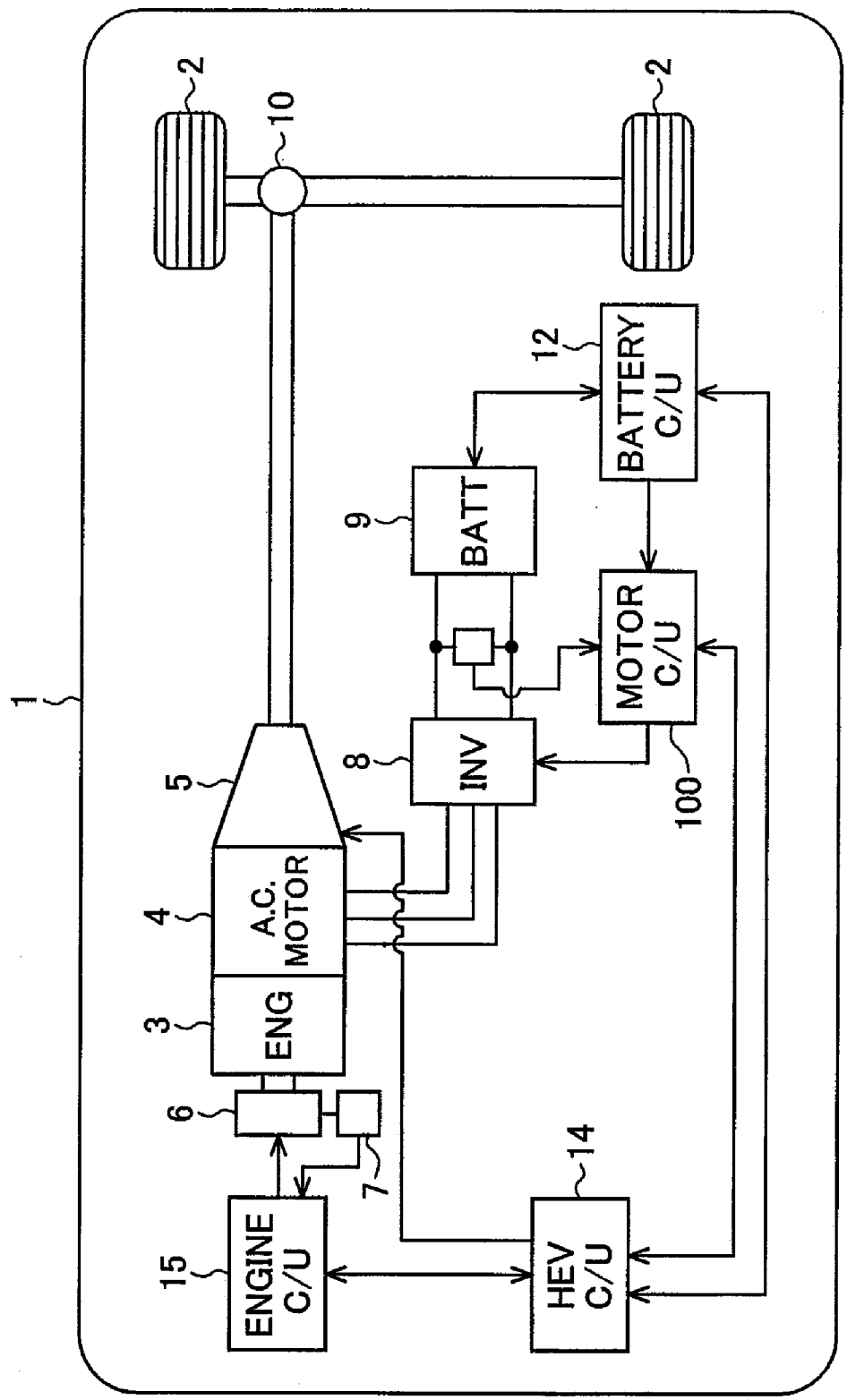
FIG. 1 is a block diagram illustrating a configuration of a hybrid vehicle which uses an AC motor with a motor control apparatus according to a first embodiment of the present invention.

The configuration of a hybrid vehicle having the motor control apparatus of the present embodiment and using an AC motor will be first described using FIG. 1.

FIG. 1 is a block diagram illustrating the configuration of the hybrid vehicle which uses an AC motor with the motor control apparatus according to the first embodiment of the present invention.

The hybrid vehicle 1 includes an engine 3 and an AC motor 4. Driving force from the engine 3 is transmitted to driving wheels 2 via a transmission 5, a differential gear 10, and an axle 13, thereby to drive the driving wheels 2. Output from the engine 3 is controlled by an electronically controlled throttle 6 driven in accordance with a command from an engine control apparatus 15. The electronically controlled throttle 6 has an accelerator angle sensor 7 to detect an opening angle of an accelerator opening. Driving force from the AC motor 4 is transmitted to the driving wheels 2 via the differential gear 10 and the axle 13, thereby to drive the driving wheels 2.

The AC motor 4 is a motor-generator. The AC motor 4 outputs driving force to operate as an electric motor. The AC motor 4, driven by the engine 3 and the driving wheels 2, also outputs AC power to operate as an electric power generator.

An inverter 8 is provided to arbitrarily control required motive power in the AC motor 4. The inverter 8 converts DC power prestored within a battery 9, into AC power, and supplies the AC power to the AC motor 4. For regenerative braking and for electric power generation, the AC power output from the AC motor 4 is converted into DC power by the inverter 8 and then supplied to the battery 9.

For actuation of the driving wheels 2, the AC motor 4 is driven using the electric power stored within the battery 9. For regenerative braking via the driving wheels 2, regenerative electric power obtained from the AC motor 4 is supplied to the battery 9.

A hybrid electric vehicle (HEV) control apparatus 14 is connected to the engine control apparatus 15, the motor control apparatus 100, and a battery control apparatus 12, via a communications element such as a controller area network (CAN). The HEV control apparatus 14, as an HEV system, performs such control that calculates data, such as torque commands to the AC motor 4, in accordance with vehicle information and states of the vehicle constituent elements.

The battery control apparatus 12 calculates parameter on the battery 9, such as a charge state, electric current limit values, electric power limits, a temperature, and a lifetime. When the motor control apparatus 100 drives the inverter 8 in accordance with the torque command data to the AC motor 4, obtained from the host HEV control apparatus 14, the motor control apparatus 100 makes a motor control scheme changeable according to the particular state of the battery 9. Accordingly, a response speed can be raised by obtaining status information of the battery 9 directly from the battery control apparatus 12, not indirectly from the HEV control apparatus 14 through the CAN. In addition, processing of the battery control apparatus 12 and the motor control apparatus 100 can likewise be achieved by integrating both.

The AC motor 4 in the present embodiment is used as a motor-generator, so during operation as a generator, the AC motor 4 is controlled so as to avoid such battery charging that causes a flow of a large current into the battery. Thus, effects upon battery life can be minimized.

Figure 2:
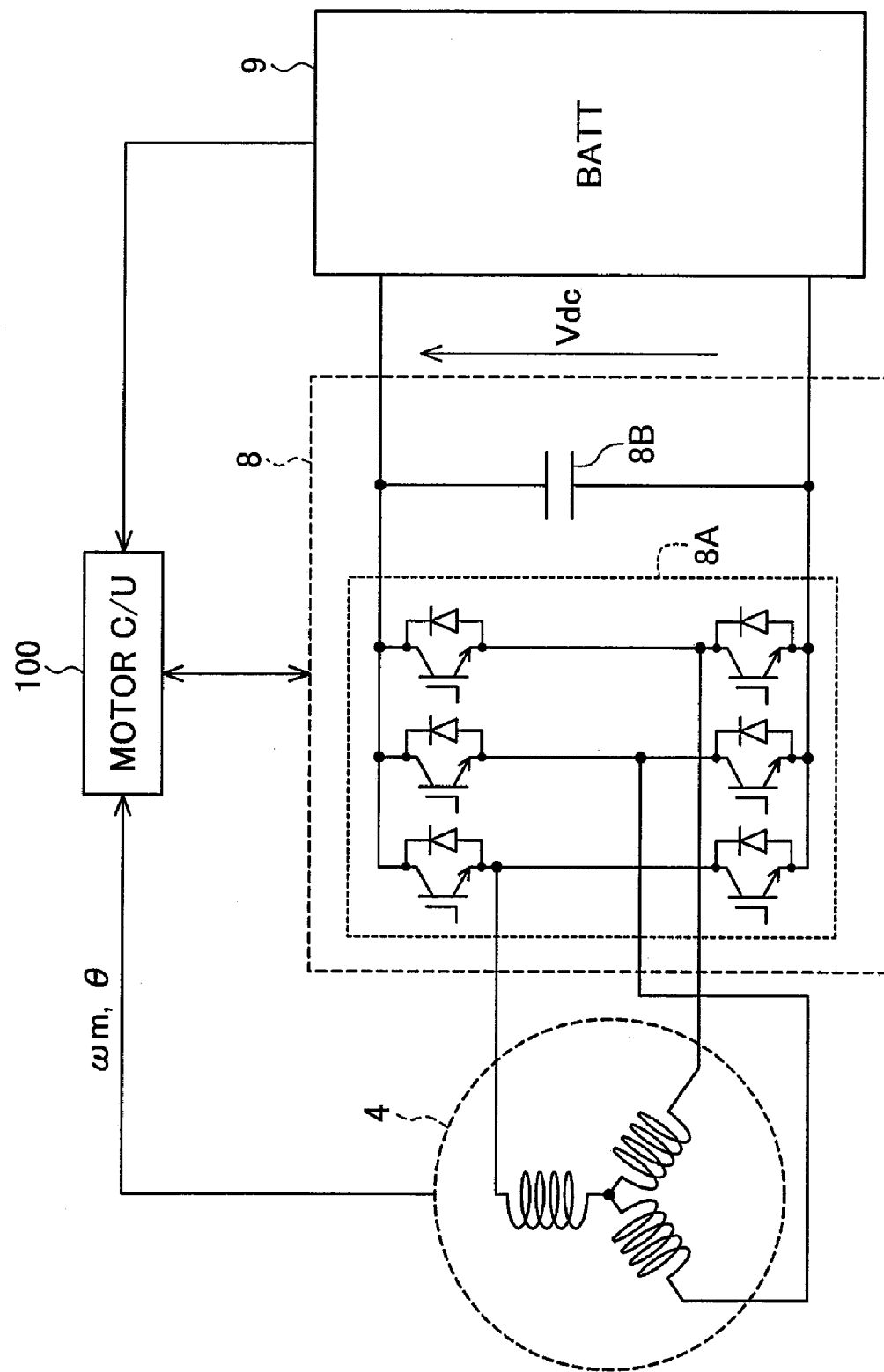
FIG. 2 is a block diagram illustrating a configuration of a motor-driving system which uses the motor control apparatus according to the first embodiment of the present invention.

A configuration of a motor-driving system which uses the motor control apparatus of the present embodiment will be next described using FIG. 2.

FIG. 2 is a block diagram illustrating the configuration of the motor-driving system using the motor control apparatus according to the first embodiment of the present invention.

The battery 9 has its output terminal connected across an input terminal of the inverter 8. The inverter 8 is a PWM inverter including: a power converter 8A with a plurality of bridge-connected power-switching elements, a smoothing capacitor 8B, and the like.

The inverter 8 converts the DC voltage Vdc of the battery 9 into an AC voltage, and applies the AC voltage to the AC motor 4. When the AC motor 4 operates as a generator, output power from the generator is converted into DC voltage form before being stored into the battery 9.

In accordance with a motor torque command Tm* that is input from an external control apparatus, the motor control apparatus 100 determines an AC voltage to be applied from the inverter 8 to the motor 4, and then outputs a voltage pulse signal as a voltage command to the inverter 8. Information on a rotor magnetic-pole position θ and motor speed ωm of the AC motor 4 is input to the motor control apparatus 100.

Figure 3:
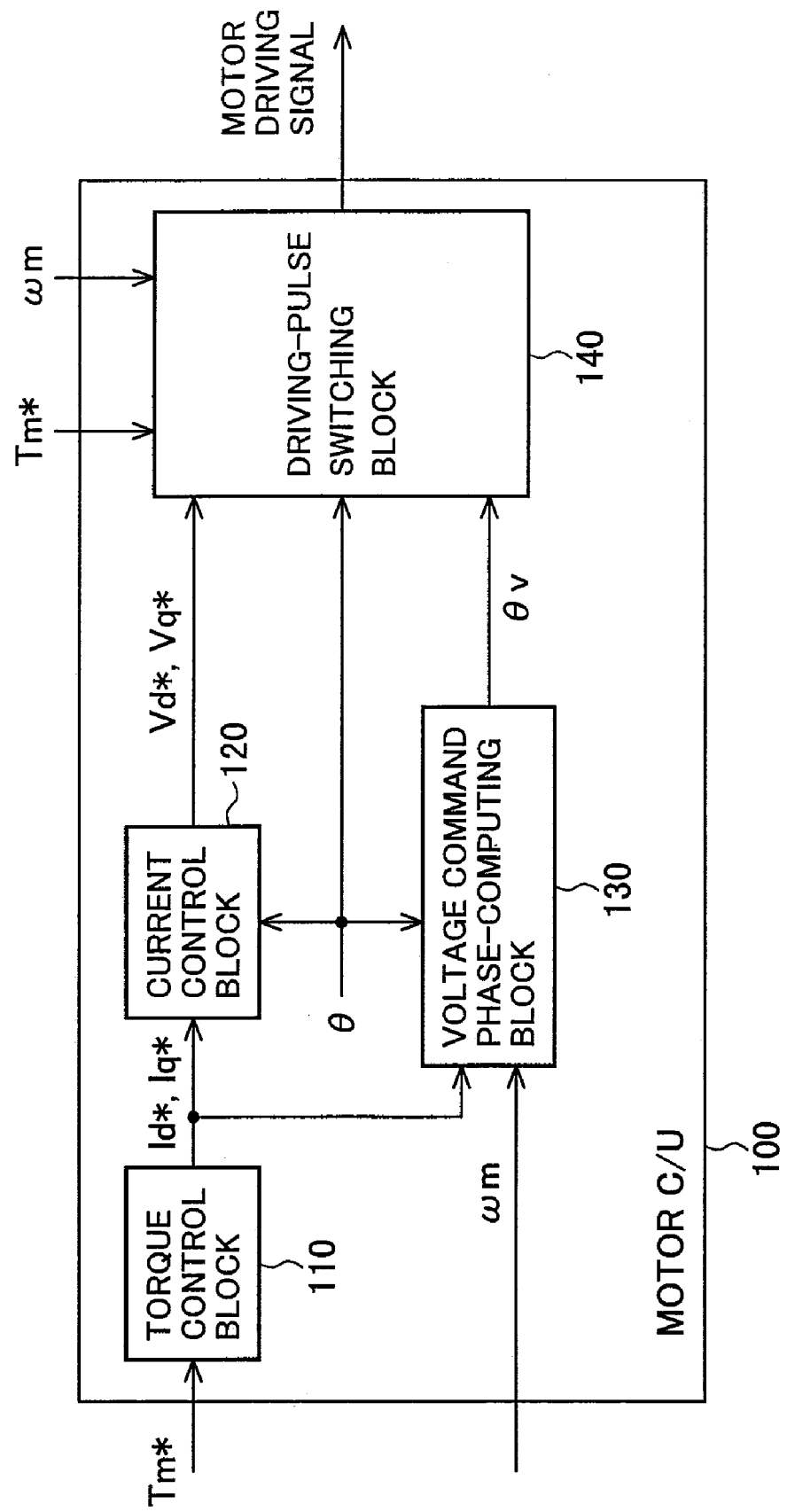
FIG. 3 is a block diagram illustrating a configuration of the motor control apparatus of the first embodiment of the present invention.

The configuration of the motor control apparatus according to the present embodiment will be next described using FIG. 3.

FIG. 3 is a block diagram illustrating the configuration of the motor control apparatus according to the first embodiment of the present invention.

The motor control apparatus 100 includes a torque control block 110, a current control block 120, a voltage command phase-computing block 130, and a driving-pulse switching block 140.

The torque control block 110 calculates appropriate motor current commands Id* and Iq* of a d-axis and a q-axis according to the received motor torque command Tm*, and outputs the calculated commands to the current control block 120 and the voltage command phase-computing block 130.

The current control block 120 calculates voltage commands for PWM driving of the AC motor 4. In accordance with the received motor current commands Id* and Iq*, the current control block 120 outputs appropriate motor voltage commands Vd* and Vq* of the d-axis and the q-axis to the driving-pulse switching block 140.

The driving-pulse switching block 140 outputs a PWM signal as a motor-driving signal based upon the received motor voltage commands Vd*, Vq*.

The PWM signal output from the driving-pulse switching block 140 in the motor control apparatus of the present embodiment will be described using FIGS. 4A and 4B.

Figure 4:
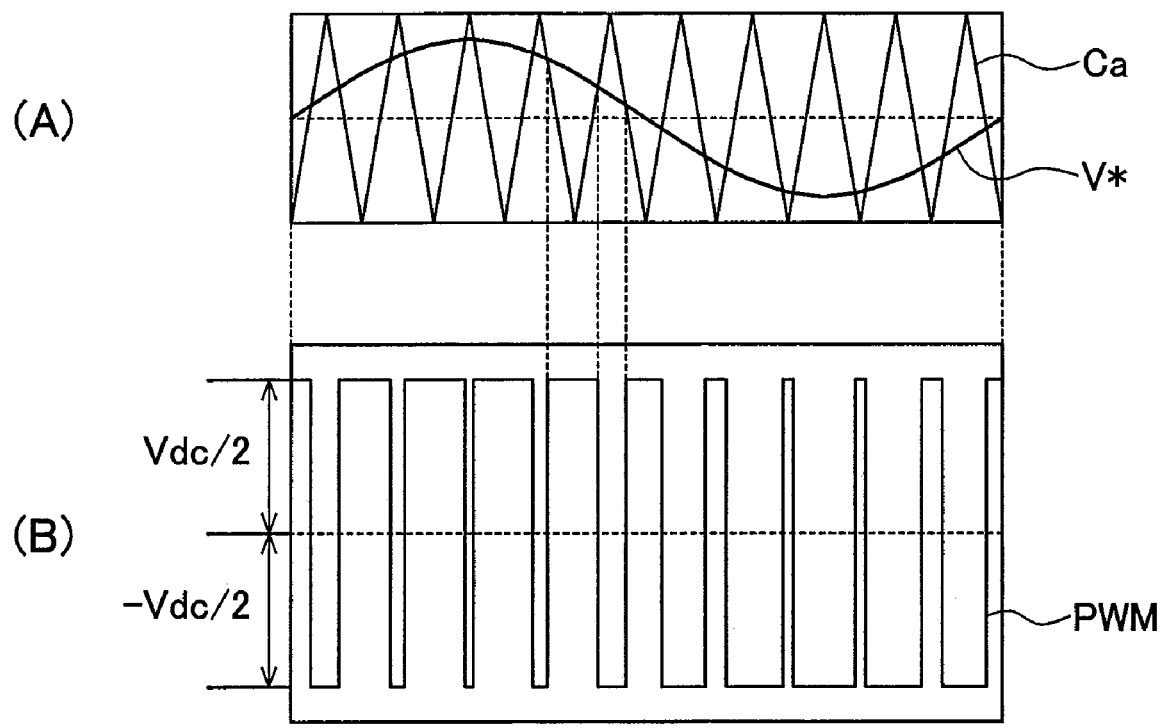
FIG. 4 is an explanatory diagram of a PWM signal output from a driving-pulse switching block in the motor control apparatus of the first embodiment of the present invention.

FIG. 4 is an explanatory diagram of the PWM signal output from the driving-pulse switching block 140 in the motor control apparatus according to the first embodiment of the present invention.

Section (A) of FIG. 4 shows a PWM carrier Ca computed in the driving-pulse switching block 140, and a motor voltage command (modulated wave) V* generated for one period of one phase on the basis of the motor voltage commands Vd*, Vq* output from the current control apparatus 120.

As shown in section (B) of FIG. 4, the PWM signal is generated from comparison results on levels of the PWM carrier Ca and the motor voltage command (modulated wave) V*, and amplitude of the voltage command is converted into pulse width. Switching between the bridge-connected power-switching elements 8A of the inverter 8 that are shown in FIG. 2 is based upon the PWM signal.

Since conventional PWM driving is executed in the manner discussed above, magnitude of the AC voltage actually applied to AC motor 1 is such that maximum amplitude of a fundamental wave is nearly half that of the DC voltage Vdc, that is, Vdc/2. In addition, even if a voltage utilization ratio improvement measure for superimposing ×3 harmonics of the fundamental wave is added to improve an output voltage utilization ratio of the inverter, conventional PWM driving will improve the amplitude of the fundamental wave by about 15%.

Whereas such conventional PWM driving allows the AC voltage to be applied to the motor very accurately in line with the command value, the conventional driving method has disadvantages, for example, in that the output voltage is limited to a required range and in that since the carrier frequency ranges from about several kilohertz to about 10 some kilohertz, switching loss occurs in the inverter.

Referring back to FIG. 3, the voltage command phase-computing block 130 calculates voltage commands for rectangular-wave driving of the motor, on the basis of the received motor voltage commands Vd*, Vq*. During rectangular-wave driving, since the amplitude is fixed according to the particular maximum value (Vdc), the voltage commands define only a voltage vector phase θv of the motor. The voltage vector phase θv of the motor is therefore computed using the method described below.

First, phase θvdq of the current voltage command with respect to the magnetic-pole position is calculated using expression (1).

$$\theta vdq = \tan^{-1}(Vq/Vd) \quad (1)$$

where Vd, Vq are the motor voltages at rotational coordinates d-q. These motor voltage values can be calculated using the motor current commands Id*, Iq*, the motor speed ωm, inductance of the motor, wire-winding resistance of the motor, magnetic fluxes of a magnet used in the motor, and other factors. Additionally, in motor control apparatus for hybrid vehicles and the like, the magnetic-pole position (rotor position) θ of the motor is calculable almost accurately by using a position sensor such as a resolver, or by sensorless detection.

Hence, the phase θv of the motor voltage vector V with respect to AC fixed coordinates is represented by expression (2).

$$\theta v = \theta + \theta vdq \quad (2)$$

The voltage command phase-computing block 130 calculates the voltage vector phase θv by using expression (2)

A rectangular-wave signal output from the driving-pulse switching block 140 in the motor control apparatus of the present embodiment will be described below using FIG. 5.

Figure 5:
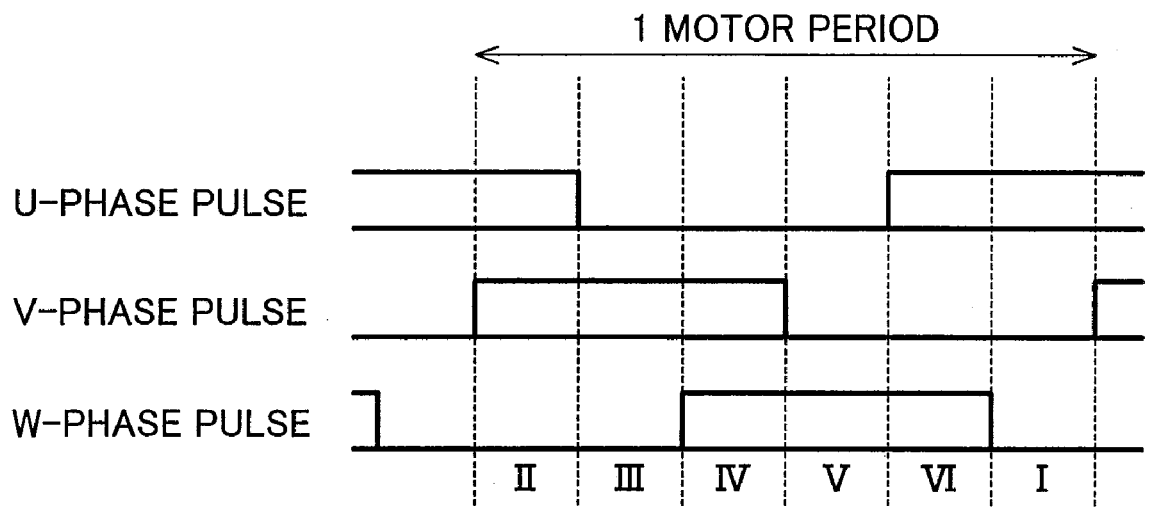
FIG. 5 is an explanatory diagram of a rectangular-wave signal output from the driving-pulse switching block in the motor control apparatus according to the first embodiment of the present invention.

FIG. 5 is an explanatory diagram of the rectangular-wave signal output from the driving-pulse switching block 140 in the motor control apparatus according to the first embodiment of the present invention.

Rectangular-wave driving is the driving scheme applied to motor control apparatuses for hybrid vehicles and the like in recent years to compensate for the disadvantages of PWM driving that the output voltage is limited to the required range and that the inverter suffers a switching loss.

FIG. 5 shows the motor-driving signal output to the inverter during rectangular-wave driving. As shown in FIG. 5, voltage pulses developed during rectangular-wave driving are equivalent to the motor frequency and differ from the carrier frequency occurring during PWM driving. A high-level pulse is output if the AC voltage command to the motor has a positive sign. A low-level pulse is output for a minus sign. During rectangular-wave driving described here, a half period of the motor pulse pattern becomes equivalent to a length of one switchingless pulse, so a maximum voltage that the inverter can output is obtained. In addition, since switching occurs at a rate of twice/phase for one motor period, practically no switching loss occurs in the inverter.

In normal motor-driving modes, that is, except during switching from PWM driving to rectangular-wave driving, the driving-pulse switching block 140 uses a different signal according to the particular mode. More specifically, for PWM driving, the driving-pulse switching block 140 uses the motor voltage command output from the current control block 120, and for rectangular-wave driving, uses the motor voltage phase θv output from the voltage command phase-computing block 130.

Rectangular-wave driving by the motor control apparatus according to the present embodiment will be described using FIGS. 6 and 7.

Figure 6:
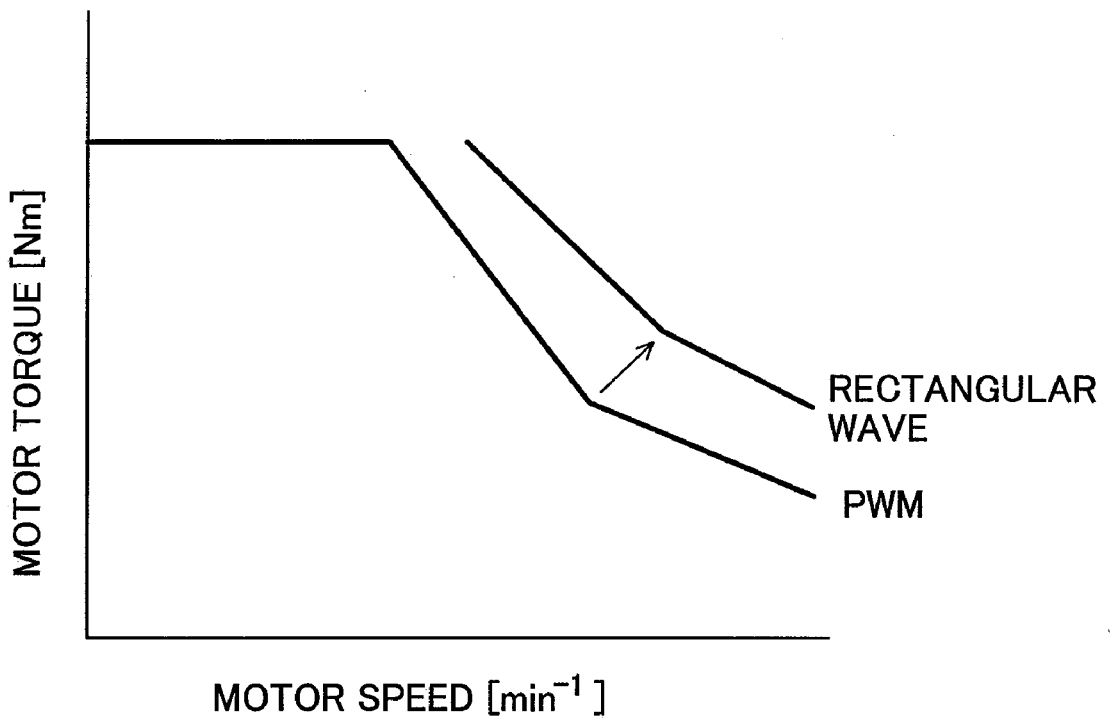
FIG. 6 is an explanatory diagram of driving characteristics of the motor controlled during rectangular-wave driving by the motor control apparatus according to the first embodiment of the present invention.

FIG. 6 is an explanatory diagram of driving characteristics of the motor controlled during rectangular-wave driving by the motor control apparatus according to the first embodiment of the present invention. FIG. 7 is an explanatory diagram of a pulse pattern obtained during rectangular-wave driving by the motor control apparatus according to the first embodiment of the present invention.

During rectangular-wave driving, since the output voltage of the inverter can be maximized and since highly efficient motor driving is possible, the operating range of the motor can be extended by nearly 20 to 30 percent of that usable during PWM driving.

Figure 7:
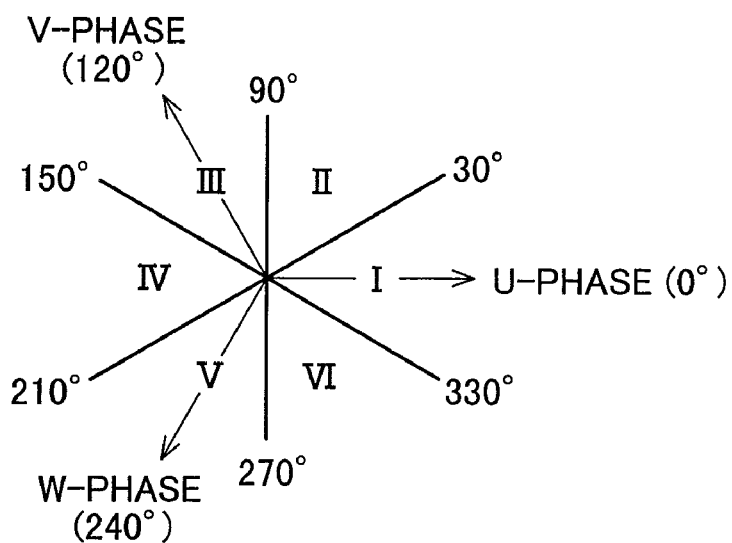
FIG. 7 is an explanatory diagram of a pulse pattern obtained during rectangular-wave driving by the motor control apparatus according to the first embodiment of the present invention.

FIG. 7 is a diagram in which the rectangular-wave driving pulse pattern in U-V-W three-phase AC fixed coordinates is represented in associated form with respect to the voltage pulses shown in FIG. 5. In the fixed coordinates of FIG. 7, the V-phase and the W-phase are positioned at 120° and 240°, respectively, with a direction of the U-phase as a reference of 0°. That is to say, the three phases are positioned at intervals of 120°. The rectangular-wave driving pulse pattern represented in such a fixed coordinate system switches between the six sections shown in FIG. 7, and the six patterns (three-phase pulse combinations) shown in FIG. 5 are the pulse patterns of those phases. Phase angles at which each pulse pattern switches in the three-phase AC fixed coordinates are 30°, 90°, 150°, 210°, 270°, and 330°, as shown in FIG. 7.

However, disadvantages exist in rectangular-wave driving. One of them is that the voltage pattern can only be updated up to six times during one cycle period of the motor. Less frequent voltage updating than in PWM driving means that the motor control system is susceptible to disturbance such as changes in speed. Additionally, since the frequency of voltage pattern updating depends upon the motor frequency, when the motor speed is low, the same pulse pattern is applied to the motor for a very long period. This is liable to make the motor current easily reach an overcurrent level in an even-lower-speed region, as well as to result in torque pulsations.

For these reasons, rectangular-wave driving is not applied to low-speed regions. Motor control apparatuses (and the like) for hybrid vehicles usually employ the technology for selectively using PWM driving and rectangular-wave driving. That is to say, PWM driving is used for low-speed regions including a stopping region, and rectangular-wave driving is used for middle/high-speed regions. Mode switching by such selective use is based primarily upon the operating points of the motor.

Selective usage control of rectangular-wave driving and PWM driving by the motor control apparatus according to the present embodiment is described below using FIGS. 8 and 9.

Figure 8:
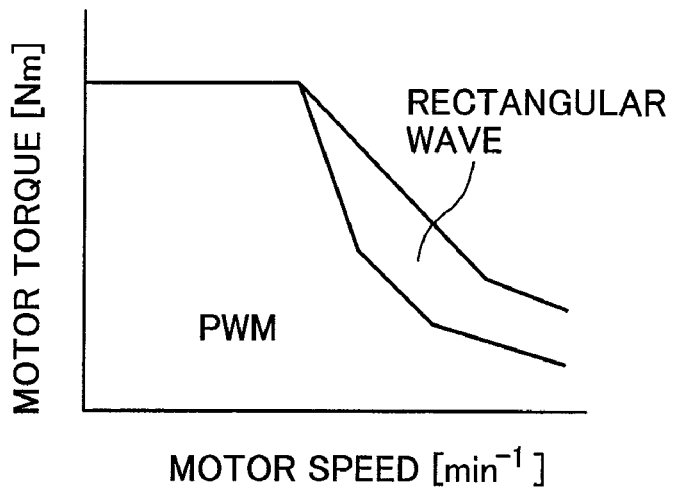
FIG. 8 is an explanatory diagram of a first example in which the motor control apparatus according to the first embodiment of the present invention selectively uses rectangular-wave driving and PWM driving.

FIG. 8 is an explanatory diagram of a first example in which the motor control apparatus according to the first embodiment of the present invention selectively uses rectangular-wave driving and PWM driving. FIG. 9 is an explanatory diagram of a second example in which the motor control apparatus according to the first embodiment of the present invention selectively uses rectangular-wave driving and PWM driving.

FIG. 8 shows an example of selective usage regions of rectangular-wave driving and PWM driving in a device driven by a battery as a main power supply thereof. In this example, rectangular-wave driving is applied to a middle/high-speed region that provides a relatively high torque.

Figure 9:
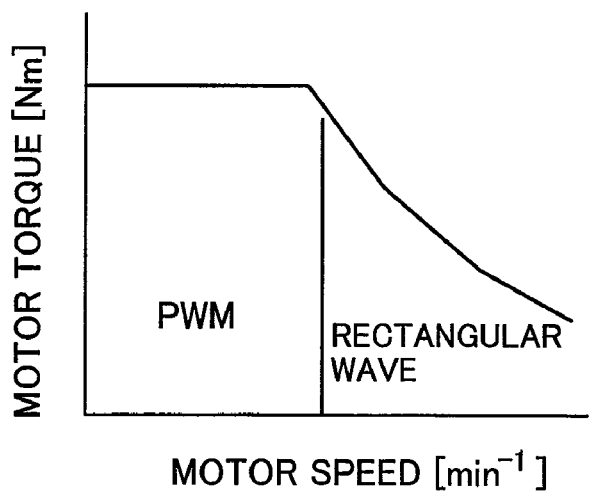
FIG. 9 is an explanatory diagram of a second example in which the motor control apparatus according to the first embodiment of the present invention selectively uses rectangular-wave driving and PWM driving.

FIG. 9 shows an example of selective usage regions of rectangular-wave driving and PWM driving in a device capable of varying a DC voltage using a DC-DC converter or the like. In this example, switching dependent only upon the motor speed is also possible.

As discussed above, during switching between PWM driving and rectangular-wave driving, the voltage vector during PWM driving is controlled very accurately by a high-frequency switching effect. Meanwhile, magnitude of the output voltage from the inverter is limited. Switching from this PWM-driving state to rectangular-wave driving in which the output voltage of the inverter can be increased to the maximum level is likely to cause events such as an sudden increase in the magnitude of the applied voltage vector and an abrupt change in the phase of the applied voltage vector, and hence to result in torque pulsations occurring during switching.

In a known conventional technique, when the driving mode is switched from PWM driving to rectangular-wave driving, the amplitude of the sine-wave signal during PWM driving is extended and an overmodulation region is formed between the PWM driving and rectangular-wave driving regions to implement switching. Ideally, switching is executable in such a scheme of changing continuously the amplitude of the signal. During actual mode switching, however, torque pulsations are still liable to occur for several reasons. One is that the voltage vector phase is fixed in one-sixths of the motor cycle period of rectangular-wave driving, and one is that a gap in voltage command updating timing between PWM driving and rectangular-wave driving occurs according to a particular operation mode of the arithmetic unit which computes and outputs the pulses, such as a microcomputer.

Next, principles of rectangular-wave and PWM driving mode switching by the motor control apparatus according to the present embodiment are described using FIGS. 10 to 13.

Figure 10:
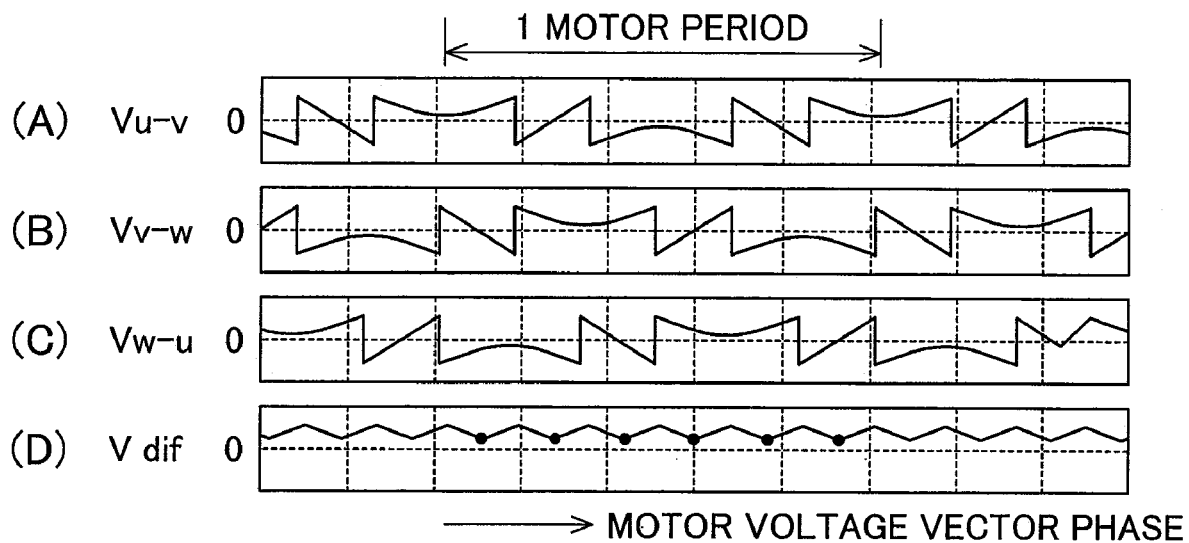
FIG. 10 is an explanatory diagram of a differential voltage between voltage vectors generated during rectangular-wave driving and PWM driving by the motor control apparatus according to the first embodiment of the present invention.
Figure 11:
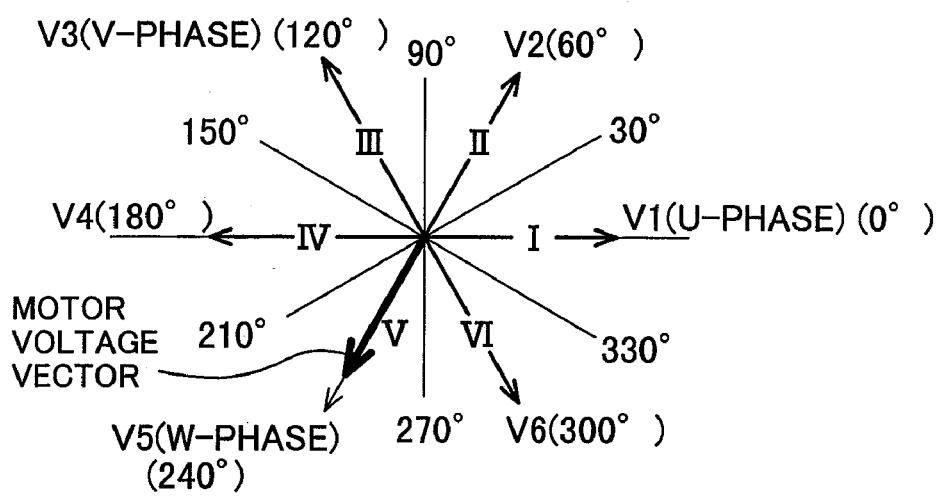
FIG. 11 is an explanatory diagram of phase angles at which the differential voltage between the voltage vectors generated during rectangular-wave driving and PWM driving by the motor control apparatus according to the first embodiment of the present invention becomes a minimum, these phase angles being represented in three-phase AC fixed coordinates.
Figure 12:
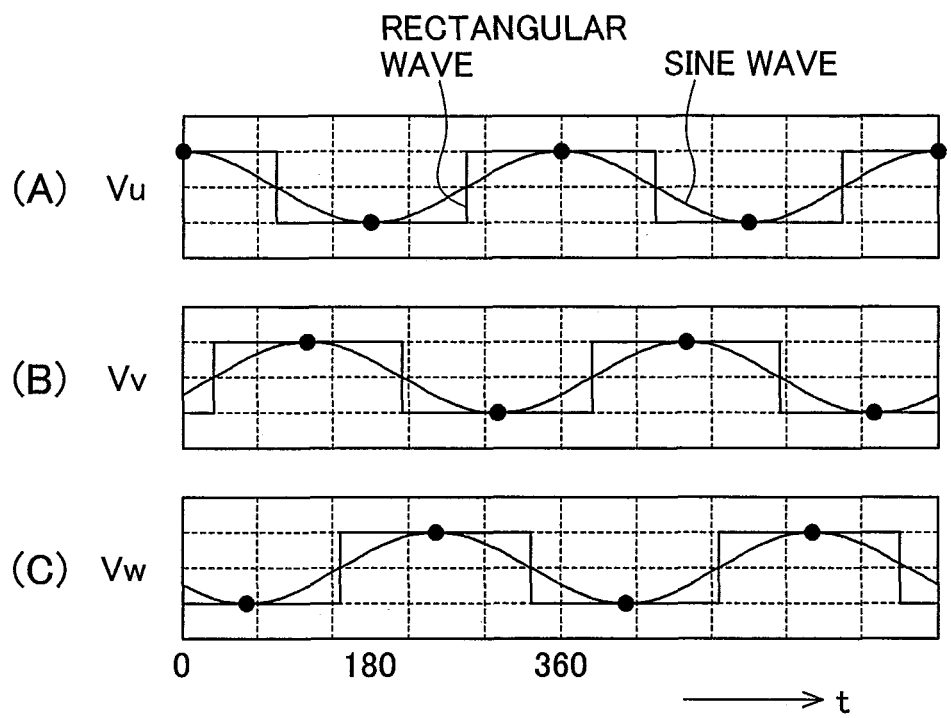
FIG. 12 is an explanatory diagram of phase directions in which the differential voltage between the voltage vectors generated during rectangular-wave driving and PWM driving by the motor control apparatus according to the first embodiment of the present invention becomes a minimum.
Figure 13:
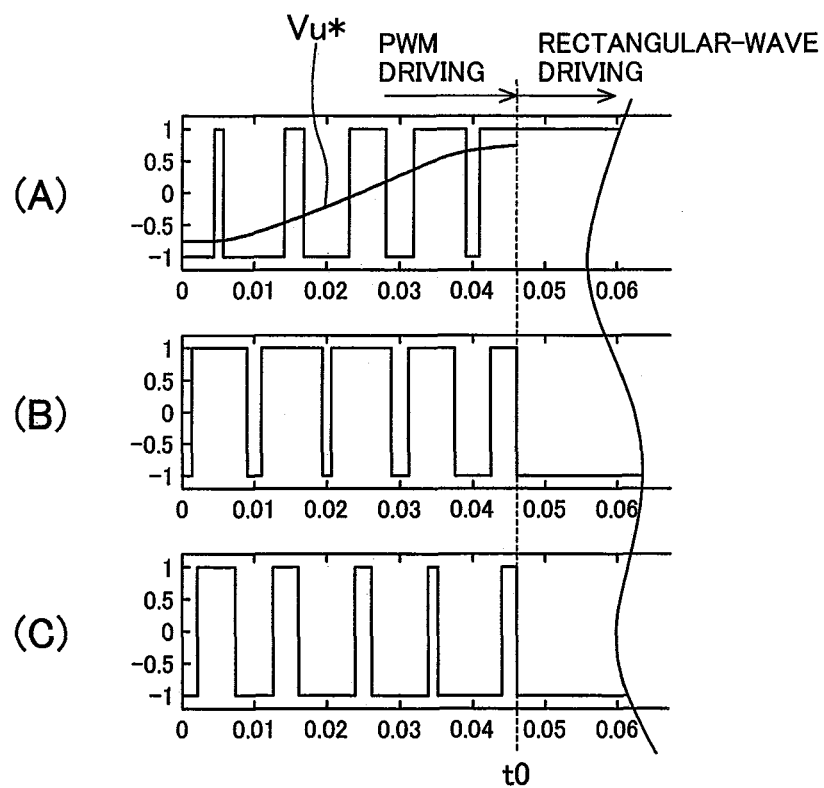
FIG. 13 is an explanatory diagram of actual pulse waveforms observed when switching from the rectangular-wave driving mode to the PWM driving mode by the motor control apparatus according to the first embodiment of the present invention is performed near a peak of a U-phase voltage.

FIG. 10 is an explanatory diagram of a differential voltage between voltage vectors generated during rectangular-wave driving and PWM driving by the motor control apparatus according to the first embodiment of the present invention. FIG. 11 is an explanatory diagram of phase angles at which the differential voltage between the voltage vectors generated during rectangular-wave driving and PWM driving by the motor control apparatus according to the first embodiment of the present invention becomes a minimum, these phase angles being represented in the three-phase AC fixed coordinates. FIG. 12 is an explanatory diagram of the phase directions in which the differential voltage between the voltage vectors generated during rectangular-wave driving and PWM driving by the motor control apparatus according to the first embodiment of the present invention becomes a minimum. FIG. 13 is an explanatory diagram of actual pulse waveforms observed when switching from the rectangular-wave driving mode to the PWM driving mode by the motor control apparatus according to the first embodiment of the present invention is performed near a peak of the U-phase voltage.

The present invention further reduces the motor torque pulsations occurring when switching between rectangular-wave driving and PWM driving is executed in the above manner. The invention focuses attention upon the switching phase not considered in conventional technology. Because of the phase relationship of the three-phase alternating current, the difference in voltage between the PWM driving voltage vector and the rectangular-wave driving voltage vector is always changing, not constant.

FIG. 10 shows the differences in voltage between the PWM driving and rectangular-wave driving voltage vectors. A horizontal axis in FIG. 10 denotes the motor voltage vector phases.

Section (A) of FIG. 10 denotes the difference in line voltage between the U-phase and V-phase coils of the AC motor 4. Section (B) of FIG. 10 denotes the difference in line voltage between the V-phase and W-phase coils of the AC motor 4. Section (C) of FIG. 10 denotes the difference in line voltage between the W-phase and U-phase coils of the AC motor 4. Section (D) of FIG. 10 denotes a maximum line-voltage difference between the phases of the AC motor 4.

As shown in section (D) of FIG. 10, the voltage difference is always changing during one period of the motor, and this voltage difference repeats alternating between maximum and minimum values. This means, therefore, that the execution of switching at the phase where the voltage difference becomes a minimum allows the torque pulsations to be minimized. The phase where the voltage difference shown in section (D) of FIG. 10 becomes a minimum (black circle in the drawing) exists in six places in one motor period.

FIG. 11 is a diagram in which the phase where the voltage difference becomes a minimum is represented in the three-phase AC fixed coordinates. Arrows V1, V2, etc., up to V6, in FIG. 11, denote the directions in which the voltage difference between the PWM driving and rectangular-wave driving voltage vectors, shown in FIG. 10, becomes a minimum.

Accordingly, the torque pulsations during switching between PWM driving and rectangular-wave driving can be reduced by executing the switching process when the voltage vector of the motor matches either the V1, V2, V3, V4, V5, or V6 phase shown in FIG. 11. FIG. 11, for example, indicates that the motor voltage vector matches the direction of 240°.

FIG. 12 is a time-based waveform representation of the V1, V2, V3, V4, V5, and V6 phase directions in which the voltage difference between the PWM driving voltage vector and the rectangular-wave driving voltage vector becomes a minimum. Section (A) of FIG. 12 denotes the U-phase voltage Vu, section (B) of FIG. 12 denotes the V-phase voltage Vv, and section (C) of FIG. 12 denotes the W-phase voltage Vw. The point of time marked with a black circle in FIG. 12 is equivalent to the phase directions in which the voltage difference becomes a minimum. In other words, the six phase directions are equivalent to the peak directions of each phase voltage.

Sections (A), (B), and (C) of FIG. 13 denote the actual pulse waveforms occurring when switching from PWM driving to rectangular-wave driving is performed near the peak of the U-phase voltage. Section (A) of FIG. 13 denotes an example of a pulse waveform developed by executing the switching process when an AC voltage command Vu* of the U-phase, for example, comes near the peak. As can be seen from the example shown in section (A) of FIG. 13, the PWM signal existing at where it is switched to the rectangular wave in accordance with the U-phase voltage command assumes the phase obtained in the near timing that the PWM pulse width of the U-phase becomes a maximum.

In addition, although section (A) of FIG. 13 indicates that switching from PWM driving to rectangular-wave driving occurs near the peak of the U-phase voltage, switching from PWM driving to rectangular-wave driving may, as shown in section (A) of FIG. 12, be performed near the minimum level of the U-phase voltage.

In this case, the PWM signal existing at where it is switched to the rectangular wave in accordance with the U-phase voltage command will assume the phase obtained in the near timing that the PWM low-level pulse width of the U-phase becomes a maximum.

Furthermore, as shown in section (A) of FIG. 12, switching can be executed near the peak of the V-phase voltage or near the minimum level thereof, or otherwise, switching can be executed near the peak of the W-phase voltage or near the minimum level thereof.

Briefly, in the present embodiment, torque pulsations can be reduced by switching the motor-driving mode near the peak or minimum level of each phase voltage. This also means that torque pulsations can be reduced by switching the motor-driving mode in the near timing that the high-level pulse width of the particular phase voltage becomes a maximum or that the low-level pulse width of the particular phase voltage becomes a maximum.

Next, the driving-pulse switching process of the driving-pulse switching block 140 in the motor control apparatus of the present embodiment will be described using FIG. 14.

Figure 14:
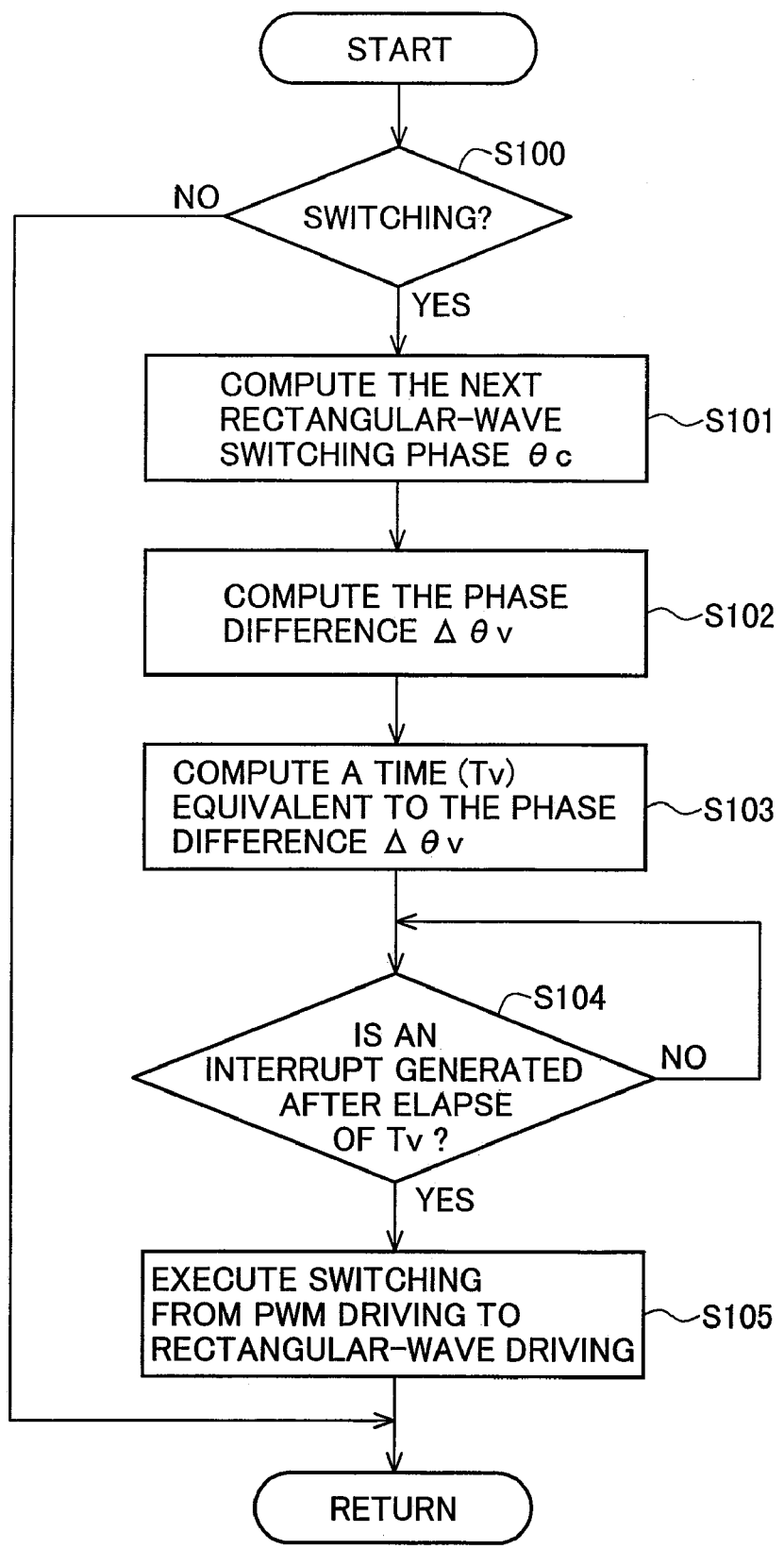
FIG. 14 is a flowchart showing the driving-pulse switching process of the driving-pulse switching block in the motor control apparatus according to the first embodiment of the present invention.

FIG. 14 is a flowchart showing the driving-pulse switching process of the driving-pulse switching block 140 in the motor control apparatus according to the first embodiment of the present invention.

In step S100, the driving-pulse switching block 140 checks such switching parameters as on a change in the operating point of the motor, and judges whether there is a need to switch from PWM driving to rectangular-wave driving.

If a switching instruction is assigned, the driving-pulse switching block 140 computes in step S101 the switching phase θc (either of the V1-V6 phases in FIG. 14; in FIG. 14, V5) that the current voltage vector V will next reach).

Next, in step S102, the driving-pulse switching block 140 performs a (θc-θv) operation to compute a phase difference Δθv with respect to a previously calculated motor voltage vector phase θv. At this time, the driving-pulse switching block 140 computes the speed ωm [rad/sec] of the AC motor 4 in addition to the magnetic-pole position θ thereof. The phase difference Δθv is therefore represented by expression (3).

$$\Delta\theta v = \omega m \times Tv \quad (3)$$

where Tv denotes time [sec] and ωm denotes the motor speed [rad/sec].

Expression (3) can be rewritten into expression (4) to calculate the time Tv during which the current motor voltage vector moves through a distance equivalent to Δθv.

$$Tv = \Delta\theta v / \omega m \quad (4)$$

Switching at the optimum switching phase (either from V1 to V6) shown in FIG. 1 becomes possible if the time Tv [sec] is calculated per expression (4).

In step S103, therefore, the driving-pulse switching block 140 calculates the time Tv during which the motor voltage vector moves through the distance equivalent to Δθv.

Next, in step S104, the driving-pulse switching block 140 counts the time Tv and then generates an interruption process after a lapse of Tv.

The point of time when the interruption process is generated is equivalent to the optimum switching phase, so in this timing, the driving-pulse switching block 140 executes switching from PWM driving to rectangular-wave driving, in step S105.

The switching process in which the torque pulsations are minimized by the control apparatus including a microcomputer or the like can be executed by performing the above process steps.

The present scheme is suitable for the motor control apparatus used for the hybrid vehicles which actively apply rectangular-wave driving. That is because, since the torque pulsations occurring during switching from PWM driving to rectangular-wave driving are likely to cause unit failures as well as to degrade riding comfort, there is a need to switch while minimizing the torque pulsations.

What is claimed is:

1. A motor control apparatus outputs a PWM signal to an inverter when a PWM driving mode that is PWM driving of the AC motor by the inverter, and a rectangular-wave signal to the inverter when a rectangular-wave driving mode that is rectangular-wave driving of the AC motor by the inverter;
the motor control apparatus comprises,
a driving-pulse switching section, when switching driving control from the PWM driving mode to the rectangular-wave driving mode, for performing the switching process at a predetermined phase within a maximum pulse-width range of high-level or low-level pulses in the PWM driving mode,
wherein the driving-pulse switching section performs the switching process when a vector of an AC voltage applied to the AC motor has reached the predetermined phase, which is a phase at which a voltage difference between a voltage vector in the PWM driving mode and a voltage vector in the rectangular-wave driving mode becomes a minimum.

2. The motor control apparatus according to claim 1, wherein:
when a U-phase direction of a three-phase AC voltage signal is defined as a reference of 0 degrees, the minimum phase is of either 0 degrees, 60 degrees, 120 degrees, 180 degrees, 240 degrees, or 300 degrees.

3. A hybrid automotive motor control apparatus used for a hybrid vehicle including an engine and an AC motor, the motor control apparatus outputs a PWM signal to an inverter when a PWM driving mode that is PWM driving of the AC motor by the inverter, and a rectangular-wave signal to the inverter when a rectangular-wave driving mode that is rectangular-wave driving of the AC motor by the inverter;

the motor control apparatus comprises, a driving-pulse switching section, when switching driving control from the PWM driving mode to the rectangular-wave driving mode, for performing the switching process at a predetermined phase within a maximum pulse-width range of high-level or low-level pulses developed in the PWM driving mode, wherein the driving-pulse switching section performs the switching process when a vector of an AC voltage applied to the AC motor has reached the predetermined phase, which is a phase at which a voltage difference between a voltage vector in the PWM driving mode and a voltage vector in the rectangular-wave driving mode becomes a minimum.

* * * * *

UNITED STATES PATENT AND TRADEMARK OFFICE
CERTIFICATE OF CORRECTION

PATENT NO.         : 8,174,221 B2
APPLICATION NO.    : 12/270461
DATED              : May 8, 2012
INVENTOR(S)        : Satoru Kaneko et al.

It is certified that error appears in the above-identified patent and that said Letters Patent is hereby corrected as shown below:

Title Page, (75) Inventors: the city of the fifth inventor is "Hitachinaka"

Signed and Sealed this
Seventeenth Day of July, 2012

David J. Kappos
*Director of the United States Patent and Trademark Office*